United States Patent
Morikawa et al.

(10) Patent No.: US 10,988,129 B2
(45) Date of Patent: Apr. 27, 2021

(54) OPERATING PORTION CONTROL DEVICE, VEHICLE CONTROL SYSTEM, AND OPERATING PORTION CONTROL METHOD

(71) Applicant: TOYOTA JIDOSHA KABUSHIKI KAISHA, Toyota (JP)

(72) Inventors: Yuta Morikawa, Miyoshi (JP); Tsukasa Nakanishi, Nagoya (JP); Yuki Ito, Iwakura (JP); Naoki Yamamuro, Nagoya (JP); Yuki Tatsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/908,858

(22) Filed: Jun. 23, 2020

(65) Prior Publication Data
US 2021/0024051 A1 Jan. 28, 2021

(30) Foreign Application Priority Data
Jul. 23, 2019 (JP) .............................. JP2019-135359

(51) Int. Cl.
*B60W 10/18* (2012.01)
*B60W 10/20* (2006.01)
*B60W 60/00* (2020.01)

(52) U.S. Cl.
CPC ............ *B60W 10/18* (2013.01); *B60W 10/20* (2013.01); *B60W 60/005* (2020.02); *B60W 2540/12* (2013.01)

(58) Field of Classification Search
None
See application file for complete search history.

(56) References Cited

U.S. PATENT DOCUMENTS

| 4,684,177 A * | 8/1987 | Ha ........................ | B60W 10/18 303/191 |
| 6,842,684 B1 * | 1/2005 | Kade ..................... | B60W 10/18 701/70 |
| 8,554,419 B2 * | 10/2013 | Crombez ............ | B60W 10/184 701/48 |
| 9,964,948 B2 | 5/2018 | Ullrich et al. | |
| 2004/0162187 A1 * | 8/2004 | Suzuki .................. | B60W 20/00 477/182 |

FOREIGN PATENT DOCUMENTS

JP 2018-184122 A 11/2018

* cited by examiner

*Primary Examiner* — Colby M Hansen
(74) *Attorney, Agent, or Firm* — Oliff PLC

(57) ABSTRACT

An operating portion control device that acquires operation amount information of a first operating portion that operates a vehicle; sends first signals representing the operation amount information of the first operating portion, and receives second signals representing operation amount information of a second operating portion that operates the vehicle, the second operating portion being different from the first operating portion; switches between a state of sending the first signals and a state of receiving the second signals; and, on the basis of the second signals received in the state of receiving, actuate the first operating portion in accordance with an operation amount of the second operating portion.

6 Claims, 11 Drawing Sheets

OPERATING PORTION CONTROL DEVICE, VEHICLE CONTROL SYSTEM, AND OPERATING PORTION CONTROL METHOD

CROSS-REFERENCE TO RELATED APPLICATION

This application is based on and claims priority under 35 USC 119 from Japanese Patent Application No. 2019-135359 filed on Jul. 23, 2019, the disclosure of which is incorporated by reference herein.

BACKGROUND

Technical Field

The present disclosure relates to an operating portion control device and a vehicle control system.

Related Art

Japanese Patent Application Laid-Open (JP-A) No. 2018-184122 discloses an invention relating to an auxiliary brake device for a training vehicle. In this auxiliary brake device for a training vehicle, a brake pedal (an operating portion) disposed at a front passenger seat side and a brake device disposed at a driver seat side are connected via a cable. When the brake pedal at the front passenger seat side is pressed, the brake device operates.

In a training vehicle, with a view to improving technique of an occupant of a driver seat, which is to say a training student (a first operator), it is preferable if operation amounts of a steering wheel and operation amounts of a brake pedal can be demonstrated directly to the training student by a trainer (a second operator). Further, with a view to the trainer checking a proficiency level of the training student, it is preferable if the trainer can verify operation amounts of the steering wheel and operation amounts of the brake pedal by the training student.

In the conventional technology recited in JP-A No. 2018-184122, although the brake device may be operated from the front passenger seat side, operation amounts of the brake pedal by an occupant at the front passenger seat side may not be transmitted to an occupant at the driver seat side. In other words, there is scope for improvement of the technology recited in JP-A No. 2018-184122 in regard to transmitting operation amounts of operating portions between a first operator and a second operator.

SUMMARY

An aspect of the disclosure is an operating portion control device that includes: a memory and a processor connected to the memory. The processor is configured to: acquire operation amount information of a first operating portion that operates a vehicle; send first signals representing the operation amount information of the first operating portion, and receive second signals representing operation amount information of a second operating portion that operates the vehicle, the second operating portion being different from the first operating portion; switch between a state of sending the first signals and a state of receiving the second signals; and, on the basis of the second signals received in the state of receiving, actuate the first operating portion in accordance with an operation amount of the second operating portion.

DETAILED DESCRIPTION

Below, an exemplary embodiment of a vehicle control system 10 according to the present disclosure is described using FIG. 1 to FIG. 11B. As shown in FIG. 6, the vehicle control system 10 is structured with a vehicle 12, remote operation equipment 14 and a server 16.

Figure 1:
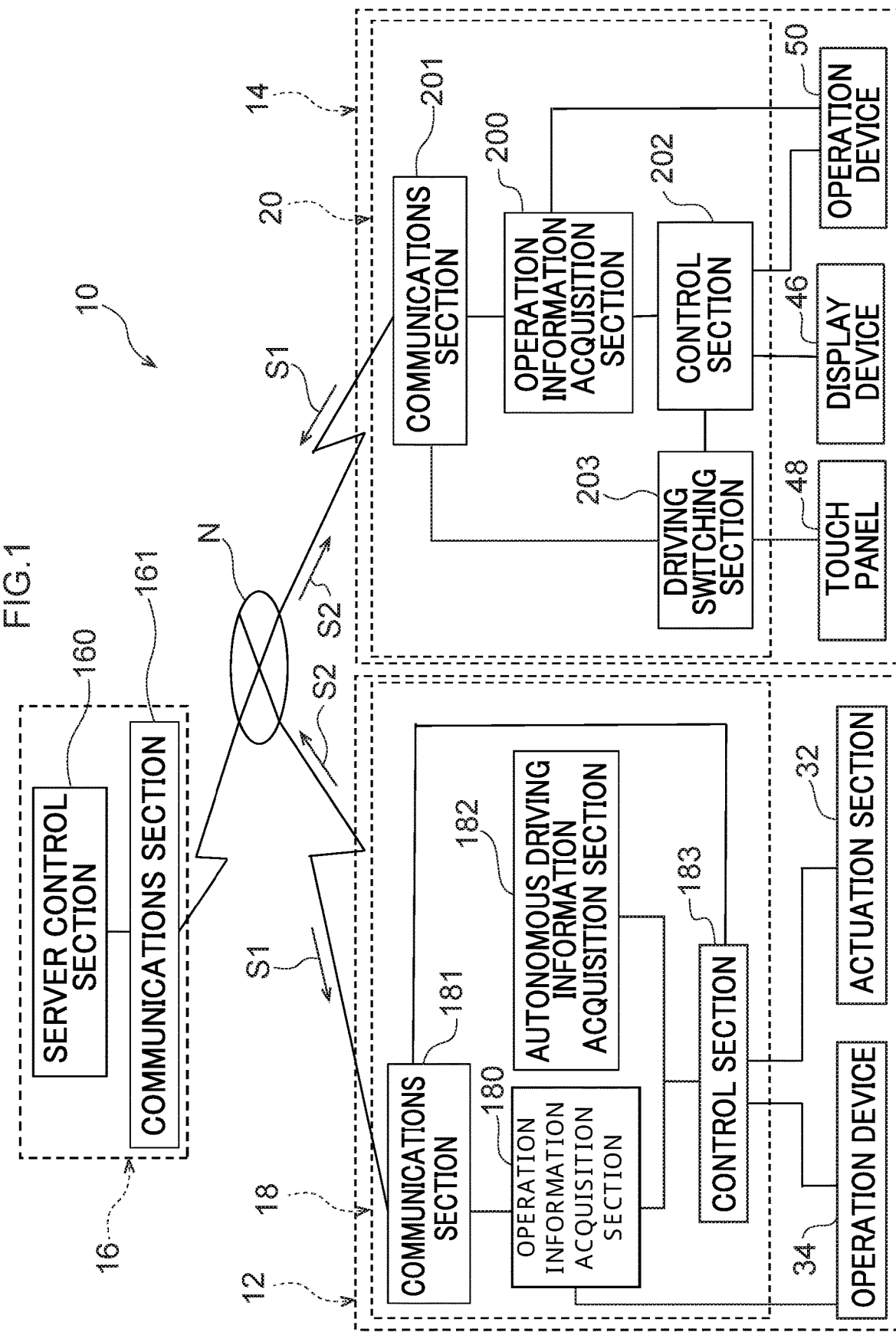
FIG. 1 is a functional block diagram illustrating structures of a vehicle control system according to a present exemplary embodiment.

As shown in FIG. 1, the vehicle 12 is provided with a vehicle control device 18, and the remote operation equipment 14 is provided with a remote control device 20, which serves as an operating portion control device. The vehicle control device 18, the remote control device 20 and the server 16 are connected to one another to be capable of communications via a network N.

As is described in detail below, the vehicle 12 is structured to be capable of implementing autonomous driving by the vehicle control device 18, remote driving (remote operation) by the remote operation equipment 14 being operated by a driver 22 (a first operator), and manual driving in accordance with operations by a driver 24 of the vehicle 12 (a second operator).

Figure 2:
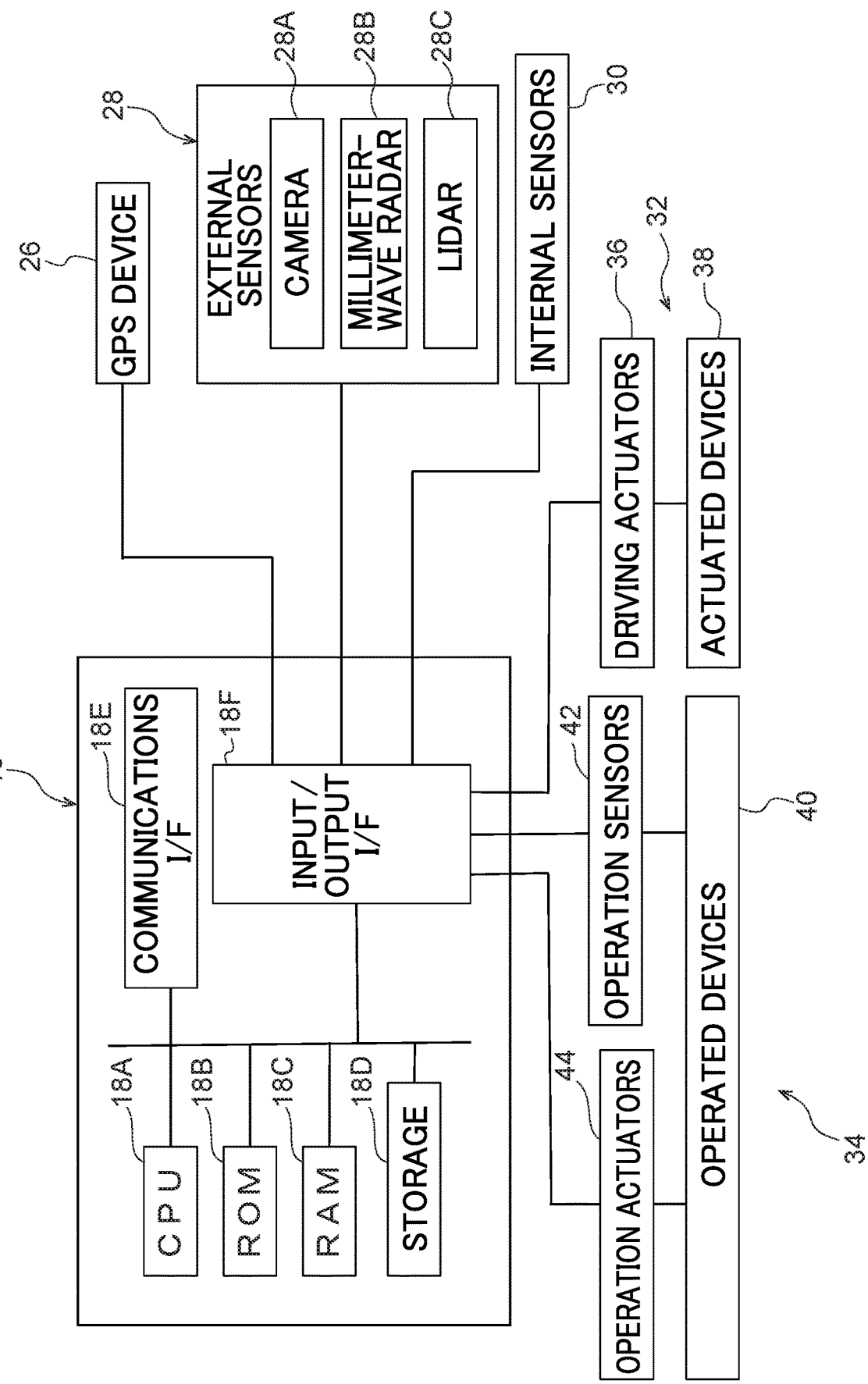
FIG. 2 is a block diagram illustrating hardware structures, at a vehicle, of the vehicle control system according to the present exemplary embodiment.

As shown in FIG. 2, the vehicle control device 18 includes a central processing unit (CPU) CPU 18A, read-only memory (ROM) 18B, random access memory (RAM) 18C, storage 18D, a communications interface (I/F) 18E, and an input/output interface 18F. The CPU 18A, ROM 18B, RAM 18C, storage 18D, communications interface 18E and input/output interface 18F are connected with one another to be capable of communications via a bus 18G.

The CPU 18A is an arithmetic processing unit, which is capable of executing various programs and controlling parts of the vehicle 12. More specifically, the CPU 18A is capable of reading a program from the ROM 18B and executing the program, using the RAM 18C as a work area. When an executable program stored in the ROM 18B is loaded and executed by the CPU 18A, the vehicle control device 18 is capable of manifesting various functions as described below.

More specifically, various programs and various kinds of data are stored in the ROM 18B. Meanwhile, the RAM 18C is capable of serving as a work area and temporarily storing programs and data.

The storage 18D includes a hard disk drive (HDD) or solid state drive (SSD). The storage 18D stores various programs, including an operating system, and various kinds of data. The storage 18D is capable of storing environment information and the like required for autonomous driving of the vehicle 12, as described below.

The communications interface 18E is an interface that is used for connection of the vehicle control device 18 with the network N. The communications interface 18E is capable of communicating with the remote control device 20, the server 16 and the like. This interface employs a communications standard such as, for example, Ethernet (registered trademark), FDDI, Wi-Fi (registered trademark) or the like. The communications interface 18E may be equipped with wireless equipment.

The communications interface 18E is capable of sending and receiving various kinds of information to and from the remote operation equipment 14 via the network N. More specifically, the communications interface 18E is capable of receiving environment information from the server 16 via the network N. This environment information can include weather information such as temperatures, wind speeds, rainfall levels and the like, earthquake information such as seismic intensities, tsunamis and the like, traffic information such as congestion, accidents, roadworks and the like, map information, and so forth. This environment information is stored at the storage 18D.

The input/output interface 18F is an interface for the vehicle control device 18 to communicate with various devices installed in the vehicle 12. The vehicle control device 18 is connected to be capable of mutual communication via the input/output interface 18F with devices that are described below. However, these devices may be connected directly to the bus 18G.

Devices that are connected to the vehicle control device 18 include a GPS (global positioning system) device 26, external sensors 28, internal sensors 30, an actuation section 32 and an operation section 34 that serves as a second operating portion.

The GPS device 26 is equipped with an antenna that receives signals from GPS satellites and is capable of determining a current position of the vehicle 12. Position information of the vehicle 12 that is determined by the GPS device 26 is inputted to the storage 18D and is temporarily stored at the storage 18D.

The external sensors 28 are a group of sensors that are used for detecting the environment surrounding the vehicle 12. The external sensors 28 are provided with a camera 28A that images a predetermined range, a millimeter-wave radar 28B that transmits scanning waves over a predetermined range, and a lidar (laser imaging detection and ranging) 28C that scans a predetermined range. Data acquired by the external sensors 28, including images captured by the camera 28A, is stored at the storage 18D, transmitted from the communications interface 18E, and sent to the remote operation equipment 14 via the server 16.

The internal sensors 30 are a group of sensors that are used for detecting running conditions of the vehicle 12. The internal sensors 30 are provided with at least one of a vehicle speed sensor, an acceleration sensor and a yaw rate sensor. Data acquired by the internal sensors 30 is stored at the storage 18D.

Figure 3:
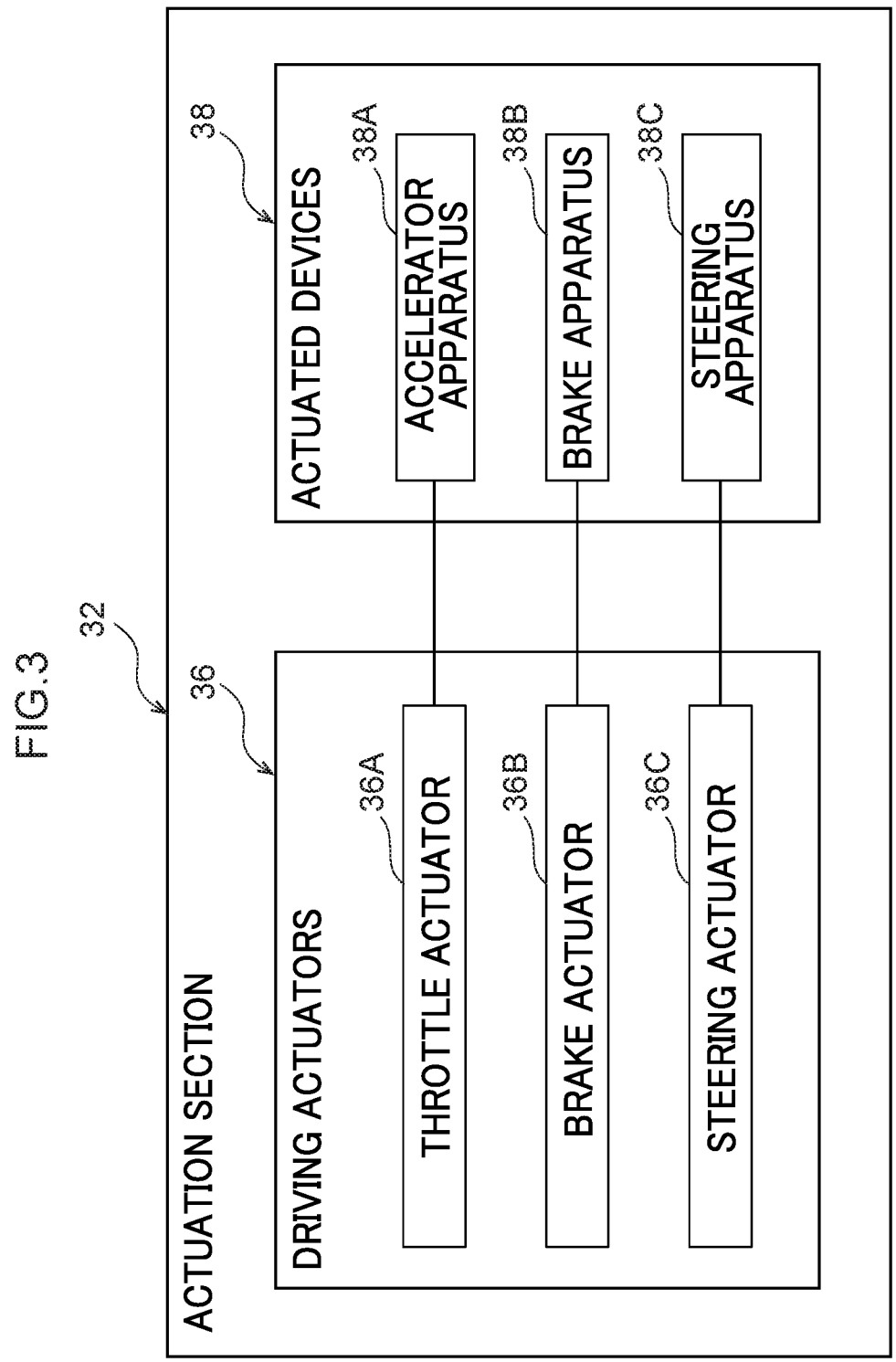
FIG. 3 is a block diagram illustrating structures of an actuation section, which is installed in the vehicle, of the vehicle control system according to the present exemplary embodiment.

The actuation section 32 is equipment that controls running of the vehicle 12 in accordance with control signals from the vehicle control device 18. The actuation section 32 is provided with driving actuators 36 and actuated devices 38. As shown in FIG. 3, the driving actuators 36 are provided with a throttle actuator 36A, a brake actuator 36B and a steering actuator 36C. The actuated devices 38 are provided with an accelerator apparatus 38A, a brake apparatus 38B and a steering apparatus 38C.

The throttle actuator 36A controls the accelerator apparatus 38A on the basis of control signals from the vehicle control device 18, and is capable of controlling drive power of the vehicle 12 by controlling amounts of air supplied to an engine of the vehicle 12 (throttle opening amounts). If the vehicle 12 is a hybrid vehicle or an electric car, the throttle actuator 36A may control a motor that is a drive source and thus control drive power of the vehicle 12 in accordance with control signals from the vehicle control device 18.

The brake actuator 36B controls the brake apparatus 38B on the basis of control signals from the vehicle control device 18 and is capable of controlling braking force applied to the wheels of the vehicle 12.

The steering actuator 36C controls actuating force of an assist motor of the steering apparatus 38C that controls steering torque on the basis of control signals from the vehicle control device 18. Thus, the steering actuator 36C is capable of controlling steering torque of the vehicle 12.

Figure 4:
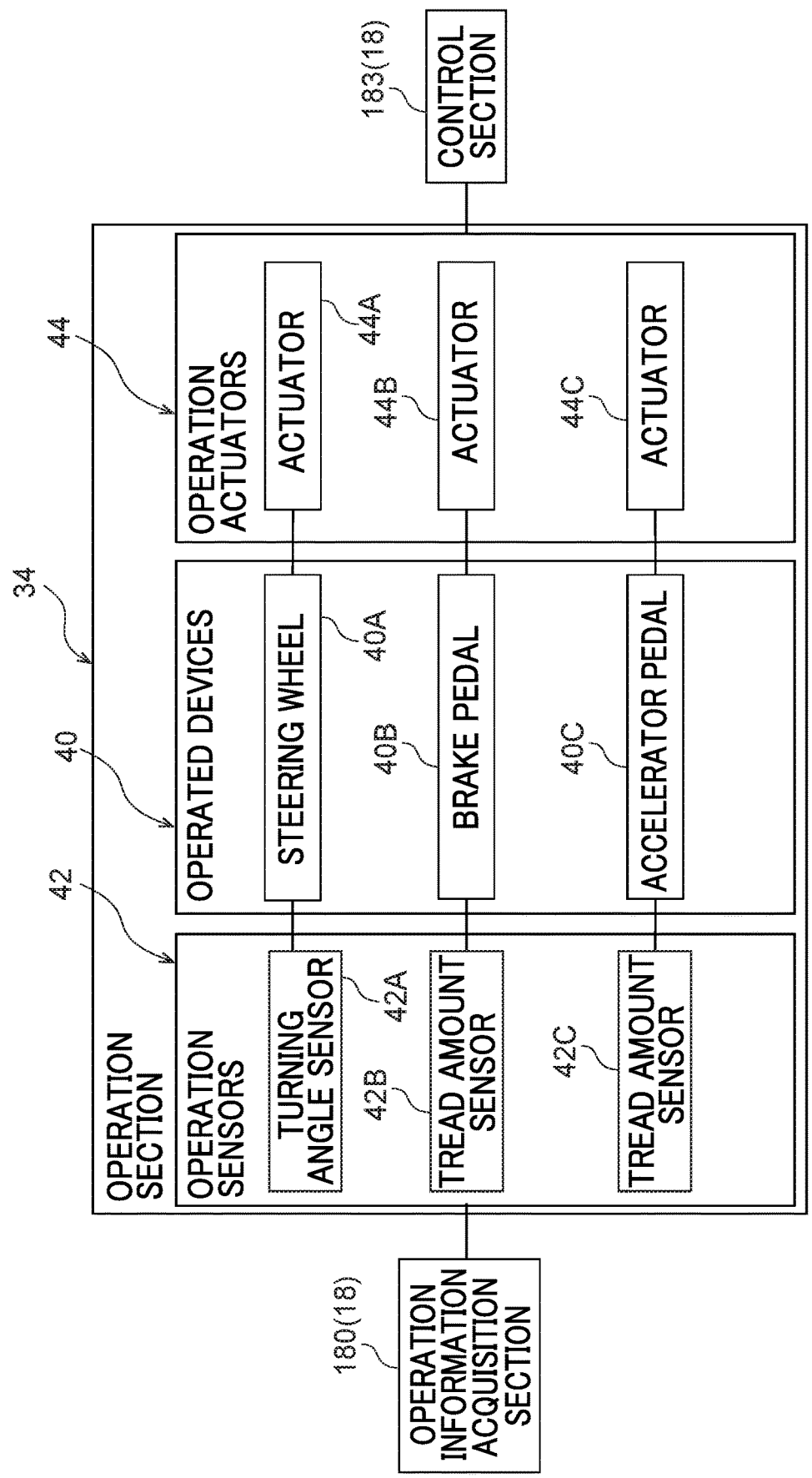
FIG. 4 is a block diagram illustrating structures of operating portions and peripherals thereof in the vehicle control system according to the present exemplary embodiment.

As shown in FIG. 4, the operation section 34 is provided with operating devices 40, operation sensors 42 and operation actuators 44. The operating devices 40 are provided with a steering wheel 40A, a brake pedal 40B and an accelerator pedal 40C, which are operated by the driver 24. During manual driving of the vehicle 12, the operation section 34 enables operation of the actuated devices 38.

The operation sensors 42 are a group of sensors that are used for detecting operation amounts of the operating devices 40. The operation sensors 42 are provided with a turning angle sensor 42A, a tread amount sensor 42B and a tread amount sensor 42C. The turning angle sensor 42A is disposed close to a turning axis of the steering wheel 40A and is capable of detecting angles and angular speeds when the steering wheel 40A turns.

The tread amount sensor 42B is disposed close to a turning axis of the brake pedal 40B and is capable of detecting amounts of pressing of the brake pedal 40B. Specifically, the tread amount sensor 42B detects angles and angular speeds when the brake pedal 40B turns about the turning axis thereof.

The tread amount sensor 42C is disposed close to a turning axis of the accelerator pedal 40C and is capable of detecting amounts of pressing of the accelerator pedal 40C. Specifically, the tread amount sensor 42C detects angles and angular speeds when the accelerator pedal 40C turns about the turning axis thereof. The aforementioned data acquired by the operation sensors 42 is stored at the storage 18D.

The operation actuators 44 are provided with a steering actuator 44A, a pedal actuator 44B and a pedal actuator 44C. The steering actuator 44A includes a motor and is provided at the turning axis of the steering wheel 40A. The steering actuator 44A is actuated on the basis of control signals from the vehicle control device 18, and is capable of turning the steering wheel 40A to arbitrary turning angles at arbitrary angular speeds.

The pedal actuator 44B includes a motor and is provided at the turning axis of the brake pedal 40B. The pedal actuator 44B is actuated on the basis of control signals from the vehicle control device 18, and is capable of turning the brake pedal 40B to arbitrary turning angles at arbitrary angular speeds. A negative torque of the motor employed at the pedal actuator 44B is set to a value capable of supporting a foot portion of the driver 24 with the brake pedal 40B in a state in which the foot portion is placed on a pedal pad of the brake pedal 40B.

The pedal actuator 44C includes a motor and is provided at the turning axis of the accelerator pedal 40C. The pedal actuator 44C is actuated on the basis of control signals from the vehicle control device 18, and is capable of turning the accelerator pedal 40C to arbitrary turning angles at arbitrary angular speeds. A negative torque of the motor employed at the pedal actuator 44C is set to a value capable of supporting a foot portion of the driver 24 with the accelerator pedal 40C in a state in which the foot portion is placed on a pedal pad of the accelerator pedal 40C.

Now, using FIG. 1, functional structures of the vehicle control device 18 are described. The CPU 18A of the vehicle control device 18 reads an executable program stored at the ROM 18B and executes the program. As a result, the vehicle control device 18 functions as an assembly of an operation information acquisition section 180 that serves as a second operation information acquisition section, a communications section 181 that serves as a second communications section, an autonomous driving information acquisition section 182, and a control section 183.

The operation information acquisition section 180 acquires data detected by the operation sensors 42 of the operation section 34 and sends this data to the communications section 181 and the control section 183. The operation information acquisition section 180 also acquires data such as captured images and the like acquired by the external sensors 28 and sends this data to the communications section 181. The operation information acquisition section 180 further acquires operation information from signals S1, which serve as first signals and are described below. That is, the operation information acquisition section 180 acquires operation amounts (first operation amount information) of others of the operating devices 40 that are at an operation section 50 of the remote operation equipment 14, which serves as a first operation section and is described below. The operation information acquisition section 180 sends signals based on these operation amounts to the control section 183.

The communications section 181 receives the signals S1 sent from the remote operation equipment 14. The communications section 181 sends the signals received from the operation information acquisition section 180, that is, signals S2 representing operation amounts of the operating devices 40 at the operation section 34 that serve as second signals (second operation amount information), to the server 16. The communications section 181 also sends data acquired by the external sensors 28 to the server 16.

The autonomous driving information acquisition section 182 acquires autonomous driving information, that is, data required for autonomous driving of the vehicle 12. The information acquired by the autonomous driving information acquisition section 182 includes position information of the vehicle 12 determined by the GPS device 26, data relating to the environment surrounding the vehicle 12 that is acquired by the external sensors 28, data relating to running states of the vehicle 12 that is acquired by the internal sensors 30, and environment information obtained from the server 16. The above-described data acquired by the autonomous driving information acquisition section 182 is sent to the control section 183.

As is described below, the control section 183 drives the actuation section 32, controlling running of the vehicle 12, on the basis of the signals S1 that the communications section 181 receives from the remote operation equipment 14. That is, in the present exemplary embodiment the control section 183 functions as a remote operation control section.

A destination is entered at a touch panel 48 connected to a driving switching section 203 of the remote operation equipment 14, which is described below. The control section 183 controls the actuation section 32 and conducts autonomous driving of the vehicle 12 on the basis of the destination and information acquired by the autonomous driving information acquisition section 182. That is, in the present exemplary embodiment the control section 183 also functions as an autonomous driving control section.

As described in detail below, the control section 183 drives the operation section 34 on the basis of signals sent from the operation information acquisition section 180 that are based on the signals S1 from the remote operation equipment 14. That is, in the present exemplary embodiment the control section 183 also functions as a second actuation control section.

Figure 5:
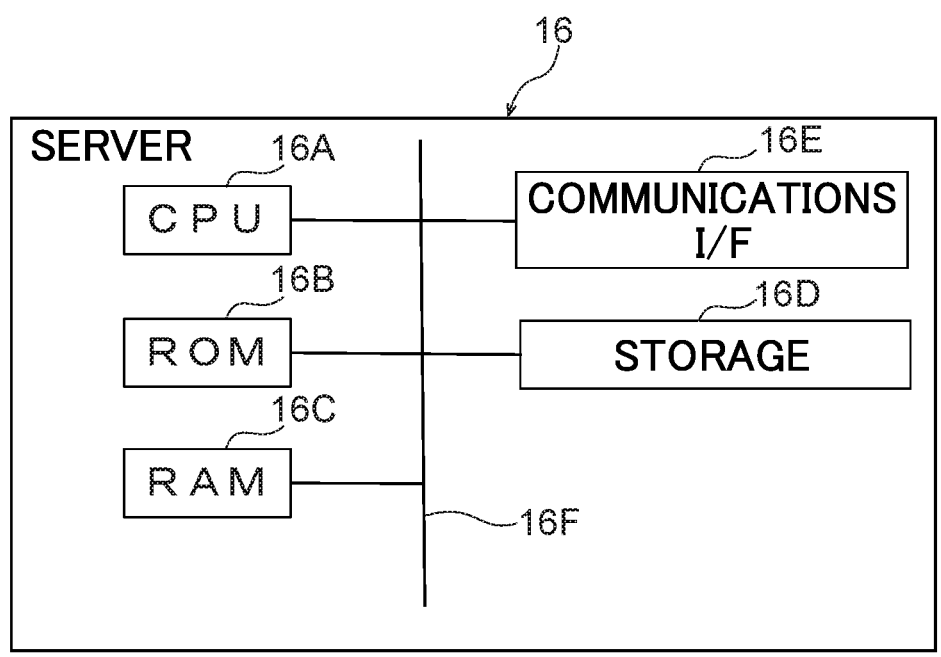
FIG. 5 is a block diagram illustrating hardware structures of a server of the vehicle control system according to the present exemplary embodiment.
Figure 6:
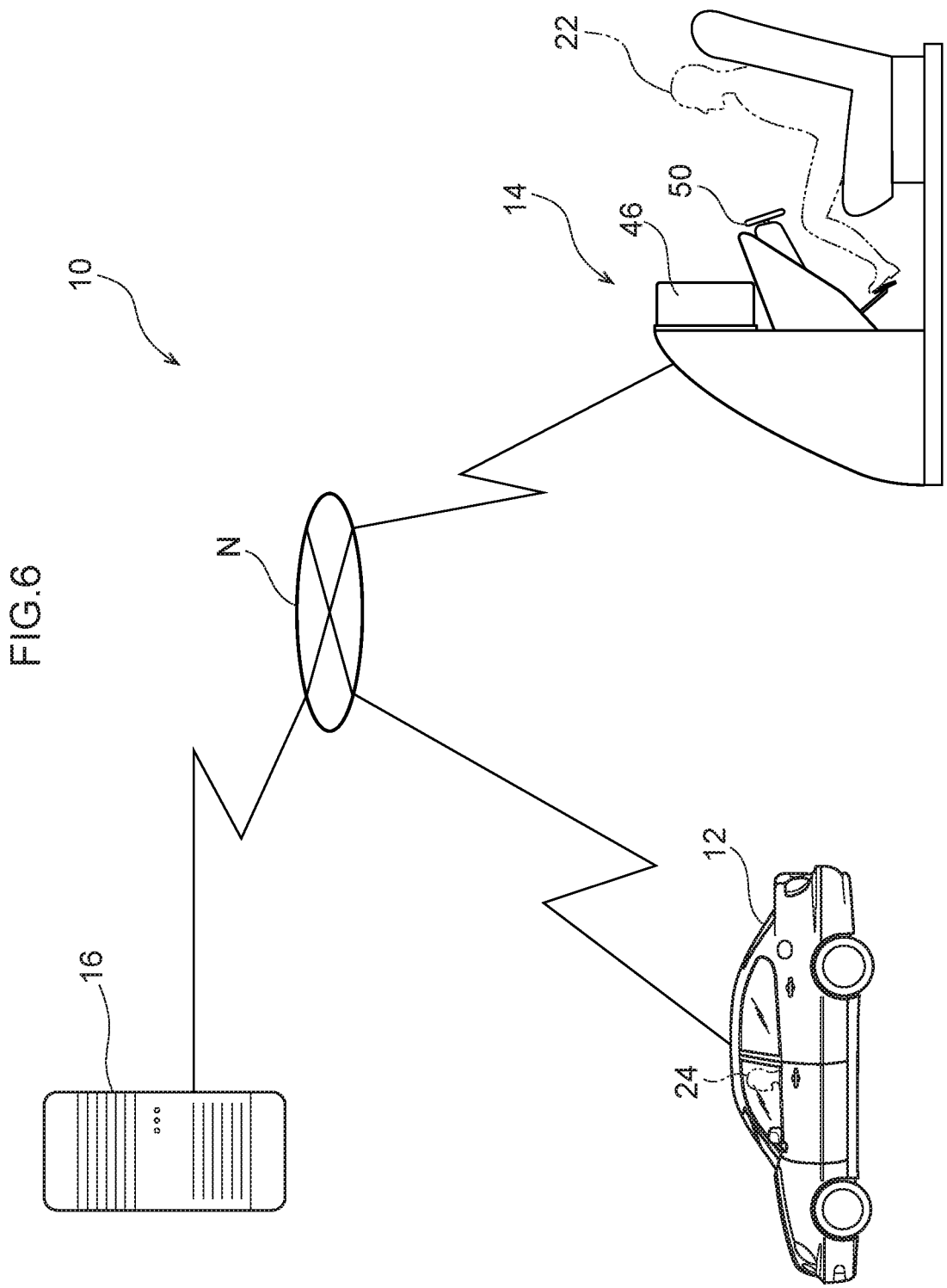
FIG. 6 is a schematic diagram illustrating structures of the vehicle control system according to the present exemplary embodiment.

Now, using FIG. 5, structures of the server 16 are described. The server 16 includes a CPU 16A, ROM 16B, RAM 16C, storage 16D and a communications interface 16E. The CPU 16A, ROM 18B, RAM 16C, storage 16D and communications interface 16E are connected to be capable of communicating with one another via a bus 16F. The CPU 16A, ROM 18B, RAM 16C, storage 16D and communications interface 16E are provided with basically similar functions to the structures of the vehicle control device 18 described above. When an executable program stored in the ROM 16B is loaded and executed by the CPU 16A, the server 16 is capable of manifesting various functions.

More specifically, as shown in FIG. 1, the server 16 functions as an assembly of a server control section 160 and a communications section 161. The server control section 160 functions to acquire various kinds of information from outside the server 16. Information acquired by the server control section 160 includes, in addition to the environment information mentioned above, news information, data based on the signals S1 sent from the remote operation equipment 14, and data based on the signals S2 sent from the vehicle 12.

The communications section 161 receives the signals S1 sent from the remote operation equipment 14 and the signals S2 sent from the vehicle 12. On the basis of the data acquired by the server control section 160, the communications section 161 sends the signals S1 and signals based on the various kinds of data to the vehicle 12, and sends the signals S2 and signals based on the various kinds of data to the remote operation equipment 14.

Now, structures of the remote operation equipment 14 are described. As shown in FIG. 6, the remote operation equipment 14 is provided with the remote control device 20, a display section 46, the touch panel 48 and the operation section 50. The operation section 50 includes the others of the operating devices 40 and others of the operation sensors 42 and the operation actuators 44, with basically similar structures to the same in the operation section 34.

Hardware structures of the remote control device 20 have basically similar structures to the vehicle control device 18. The remote control device 20 functions as an assembly of an operation information acquisition section 200 that serves as a first operation information acquisition section, a communications section 201 that serves as a first communications section, a control section 202, and the driving switching section 203. The display section 46, the touch panel 48 and the operation section 50 are connected to the remote control device 20 to be capable of mutual communications with the remote control device 20.

The operation information acquisition section 200 acquires data detected by the operation sensors 42 of the operation section 50, and sends the data to the communications section 161 and the control section 202. The operation information acquisition section 200 also sends to the control section 202 data based on signals sent from the vehicle 12 via the communications section 201. Specifically, the operation information acquisition section 200 acquires operation information from the signals S2, that is, operation amounts of the operating devices 40 of the operation section 34 at the vehicle 12, and sends signals based on these operation amounts to the control section 202.

On the basis of signals received from the operation information acquisition section 200, the communications section 201 sends the signals S1 representing operation amounts of the operating devices 40 at the operation section 50 to the server 16. In addition, the communications section 201 receives the signals S2 and signals based on various kinds of data from the server 16. The data sent from the server 16 includes data acquired by the external sensors 28 of the vehicle 12, including images captured by the camera 28A, environmental information and so forth.

The control section 202 drives the operation section 50 on the basis of the signals S2 from the vehicle 12. That is, in the present exemplary embodiment the control section 202 functions as a first actuation control section. On the basis of data acquired from the operation information acquisition section 200, the control section 202 displays images captured by the camera 28A of the vehicle 12 on plural displays constituting the display section 46.

On the basis of the signals from the touch panel 48, the driving switching section 203 sends status signals to the vehicle control device 18 via the control section 202 and communications section 201. In more detail, the touch panel 48 is provided with a liquid crystal display, and a selection screen is displayed at the liquid crystal display. The selection screen is for selection of an autonomous driving mode, a remote driving mode, a manual driving mode, a first training mode that serves as a first mode, or a second training mode that serves as a second mode.

When the driver 22 operates the touch panel 48 and selects a mode from the plural modes mentioned above, status signals indicating that the vehicle control system 10 is in that mode are sent from the driving switching section 203 to the control section 202 and the vehicle control device 18, and the vehicle control system 10 switches into that mode. The vehicle control device 18 and the remote control device 20 are configured so as to detect the status signals at predetermined time intervals.

More specifically, when the autonomous driving mode is selected by the driver 22, the vehicle control device 18 of the vehicle 12 controls the actuation section 32 with the control section 183 on the basis of the data acquired by the autonomous driving information acquisition section 182, and the vehicle control device 18 conducts autonomous driving of the vehicle 12. When the autonomous driving mode is selected at the touch panel 48, a map of the vicinity of the vehicle 12 may be displayed at the liquid crystal display of the touch panel 48 and the driver 22 may designate a destination for the vehicle 12. In the autonomous driving mode, the vehicle control device 18 of the vehicle 12 controls the actuation section 32 such that the actuated devices 38 are not effective for operation of the operating devices 40 by the driver 24.

Alternatively, when the remote operation mode is selected by the driver 22, the vehicle control device 18 of the vehicle 12 drives the actuation section 32, controlling running of the vehicle 12, on the basis of the signals S1 sent from the remote operation equipment 14. Meanwhile, the driver 22 operates the operating devices 40 at the operation section 50 in accordance with images displayed at the display section 46 and the like. Thus, the driver 22 remotely operates the vehicle 12. In the remote operation mode, the vehicle control device 18 controls the actuation section 32 such that the actuated devices 38 are not effective for operation of the operating devices 40 by the driver 24.

When the manual driving mode is selected by the driver 22, the actuated devices 38 of the vehicle 12 operate in accordance with operations of the operation section 34 by the driver 24. In the manual operation mode, the vehicle control device 18 stops sending signals to the actuation section 32.

Now, the first training mode and the second training mode are described. These modes are modes in which the vehicle 12 is employed as a training vehicle. When the vehicle control system 10 is in these modes, the driver 22 is a trainer and the driver 24 is a training student.

In the first training mode, similarly to the remote operation mode, the driver 22 operates the operating devices 40 at the operation section 50 in accordance with images displayed at the display section 46 and the like, remotely operating the vehicle 12.

In this first training mode, at the operation section 50 of the remote operation equipment 14, operation amounts of the operating devices 40 by the driver 22 are detected by the operation sensors 42. These operation amounts are sent from the remote operation equipment 14 to the vehicle 12 in the form of the signals S1.

Meanwhile, at the vehicle 12 side, the signals S1 are received by the vehicle control device 18 and the operation actuators 44 at the operation section 34 are actuated on the basis of the signals S1, thus actuating the operating devices 40. That is, in the first training mode, operation amounts of the operating devices 40 by the driver 22 are reflected at the operating devices 40 at the vehicle 12 side.

In the second training mode, similarly to the manual driving mode, the driver 24 operates the operating devices 40 at the operation section 34, operating the vehicle 12.

In this second training mode, at the operation section 34 of the vehicle 12, operation amounts of the operating devices 40 by the driver 24 are detected by the operation sensors 42. These operation amounts are sent from the vehicle 12 to the remote operation equipment 14 in the form of the signals S2.

Meanwhile, at the remote operation equipment 14 side, the signals S2 are received by the remote control device 20 and the operation actuators 44 at the operation section 50 are actuated on the basis of the signals S2, thus actuating the operating devices 40. That is, in the second training mode, operation amounts of the operating devices 40 by the driver 24 are reflected at the operating devices 40 at the remote operation equipment 14 side.

When the driving switching section 203 switches between the first training mode and the second training mode, the state of sending and the state of receiving the signals S1 and signals S2 are switched at the communications section 181 of the vehicle control device 18 and the communications section 201 of the remote control device 20. Therefore, the driving switching section 203 may be regarded as switching the state of sending signals and the state of receiving signals between the communications section 181 and the communications section 201.

Operation and Effects of the Present Exemplary Embodiment

Now, operation and effects of the present exemplary embodiment are described.

In the vehicle control system 10 according to the present exemplary embodiment, as described above, the autonomous driving mode, the remote driving mode, the manual driving mode, the first training mode and the second training mode may be selected. Below, principally using the flowcharts shown in FIG. 7 to FIG. 9, examples of control flows of the vehicle control system 10 are described.

Figure 7:
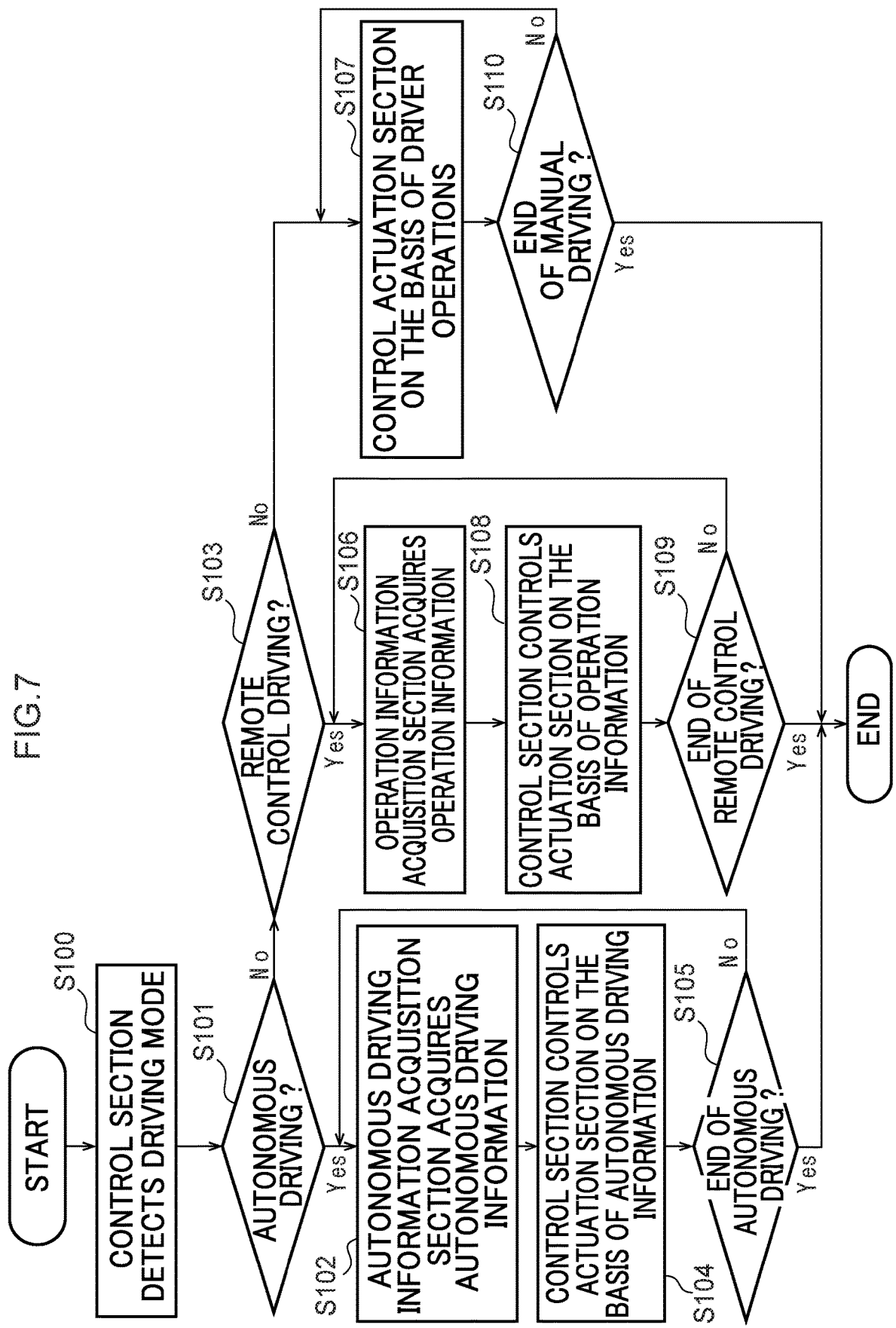
FIG. 7 is a flowchart illustrating processing of the vehicle control system according to the present exemplary embodiment during vehicle running.
Figure 8:
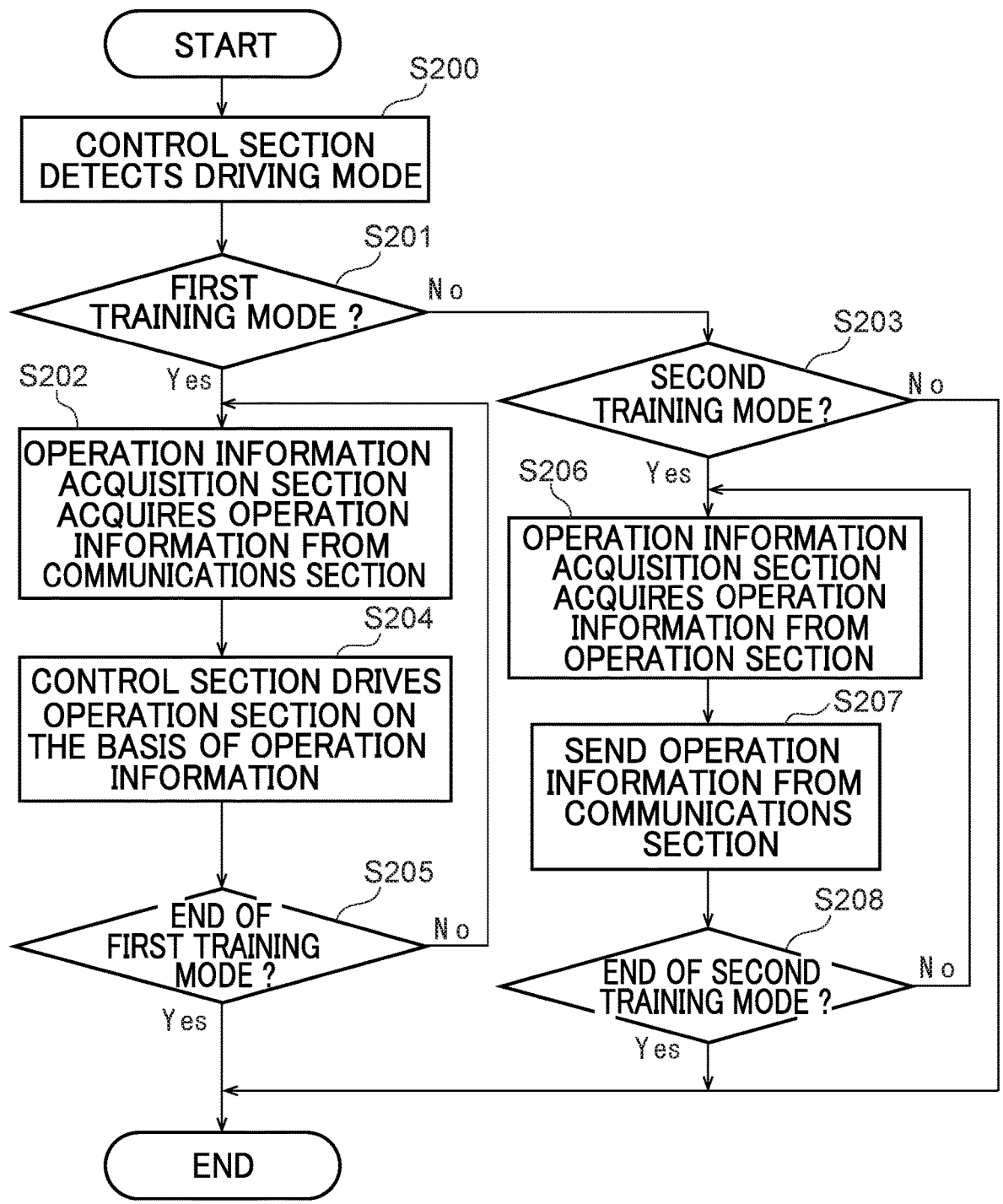
FIG. 8 is a flowchart illustrating processing at the vehicle side of the vehicle control system according to the present exemplary embodiment, in each of a first training mode and a second training mode.
Figure 9:
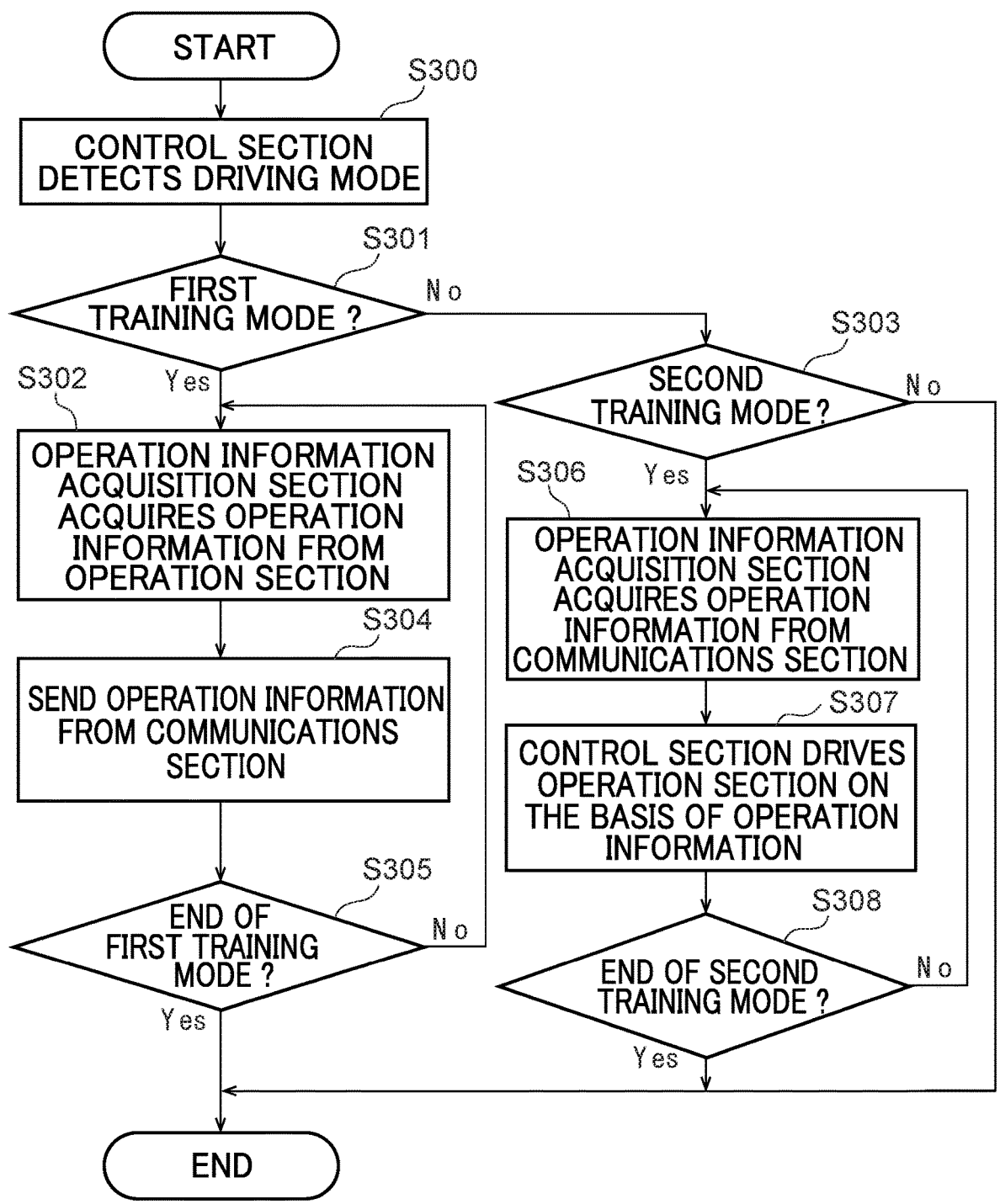
FIG. 9 is a flowchart illustrating processing at a remote operation equipment side of the vehicle control system according to the present exemplary embodiment, in each of the first training mode and the second training mode.

First, using FIG. 7, a control flow of the actuation section 32 of the vehicle 12 is described. When this control flow begins, in step S100, the CPU 18A of the vehicle control device 18 detects the driving mode of the vehicle 12 on the basis of the status signals from the remote operation equipment 14.

In step S101, on the basis of detection results from step S100, the CPU 18A makes a determination as to whether the driving mode of the vehicle 12 is the autonomous driving mode. If the driving mode of the vehicle 12 is the autonomous driving mode ("Yes" in step S101), the CPU 18A proceeds to step S102. If the driving mode of the vehicle 12 is not the autonomous driving mode ("No" in step S101), the CPU 18A proceeds to step S103.

In step S102, the CPU 18A functions as the autonomous driving information acquisition section 182 and acquires autonomous driving information.

In step S104, the CPU 18A functions as the actuation section 32, controls the actuation section 32 on the basis of the autonomous driving information acquired in step S102, and conducts autonomous driving of the vehicle 12.

In step S105, on the basis of the status signals from the remote operation equipment 14, the CPU 18A makes a determination as to whether the autonomous driving mode of the vehicle 12 has ended. If the autonomous driving mode is continuing ("No" in step S105), the CPU 18A returns to step S102. If the autonomous driving mode is ending, ("Yes" in step S105), the CPU 18A ends this control flow.

Alternatively, when the CPU 18A has proceeded from step S101 to step S103, the CPU 18A makes a determination on the basis of the detection results from step S100 as to whether the driving mode of the vehicle 12 is a remote control driving mode. The meaning of the term "remote control driving mode" as used herein is intended to include states in which the vehicle 12 is in the remote driving mode or the first training mode. If the driving mode of the vehicle 12 is a remote control driving mode ("Yes" in step S103), the CPU 18A proceeds to step S106. If the driving mode of the vehicle 12 is not a remote control driving mode ("No" in step S103), the CPU 18A proceeds to step S107.

In step S106, the CPU 18A functions as the operation information acquisition section 180 and acquires operation information from the communications section 201, that is, operation amounts of the operating devices 40 at the operation section 50 of the remote operation equipment 14.

In step S108, the CPU 18A functions as the control section 183 and controls the actuation section 32 on the basis of the operation information acquired in step S106. In other words, the driver 22 remotely controls the vehicle 12.

In step S109, on the basis of the status signals from the remote operation equipment 14, the CPU 18A detects the driving mode of the vehicle 12 and makes a determination as to whether the remote control driving mode of the vehicle 12 has ended. If the remote control driving mode is continuing ("No" in step S109), the CPU 18A returns to step S106. If the remote control driving mode is ending ("Yes" in step S109), the CPU 18A ends this control flow.

Alternatively, when the CPU 18A has proceeded from step S103 to step S107, that is, when the vehicle 12 is in the manual driving mode, the CPU 18A controls the actuation section 32 in accordance with operations by the driver 24.

In step S110, on the basis of the status signals from the remote operation equipment 14, the CPU 18A makes a determination as to whether the manual driving mode of the vehicle 12 has ended. If the manual control driving mode is continuing ("No" in step S110), the CPU 18A returns to step S107. If the manual driving mode is ending ("Yes" in step S110), the CPU 18A ends this control flow.

Now, using FIG. 8 and FIG. 10A to FIG. 11B, a control flow of the operation section 34 of the vehicle 12 is described. When this control flow is started, in step S200, the CPU 18A of the vehicle control device 18 detects the driving mode of the vehicle 12 on the basis of the status signals from the remote operation equipment 14.

In step S201, on the basis of detection results from step S200, the CPU 18A makes a determination as to whether the driving mode of the vehicle 12 is the first training mode. If the driving mode of the vehicle 12 is the first training mode ("Yes" in step S201), the CPU 18A proceeds to step S202. If the driving mode of the vehicle 12 is not the first training mode ("No" in step S201), the CPU 18A proceeds to step S203.

In step S202, the CPU 18A functions as the operation information acquisition section 180 and acquires operation information from the communications section 181, that is, operation amounts of the operating devices 40 at the operation section 50 of the remote operation equipment 14.

In step S204, the CPU 18A functions as the control section 183 and drives the operation section 34 on the basis of this operation information.

Figure 10A:
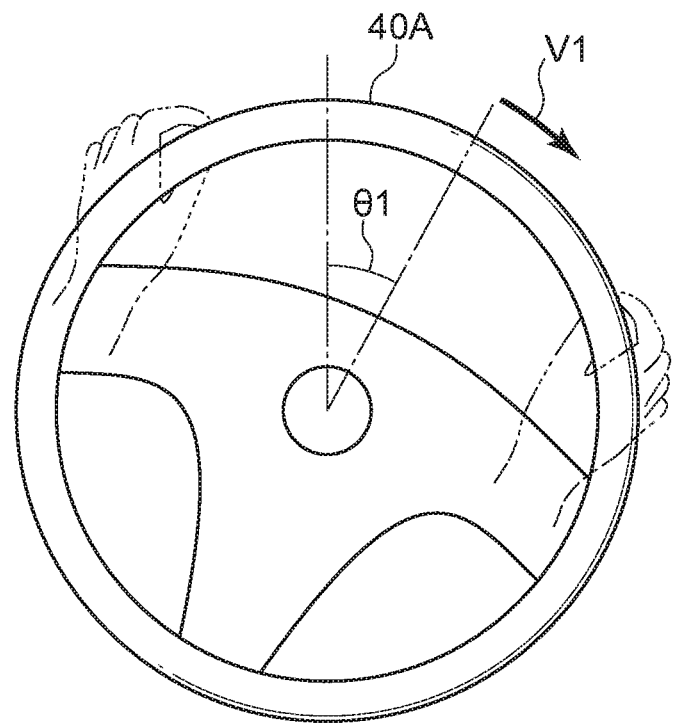
FIG. 10A is a schematic diagram showing movements of steering wheels in the first training mode and the second training mode of the vehicle control system according to the present exemplary embodiment, illustrating movement of a steering wheel of the remote operation equipment in the first training mode and of a steering wheel of the vehicle in the second training mode.
Figure 10B:
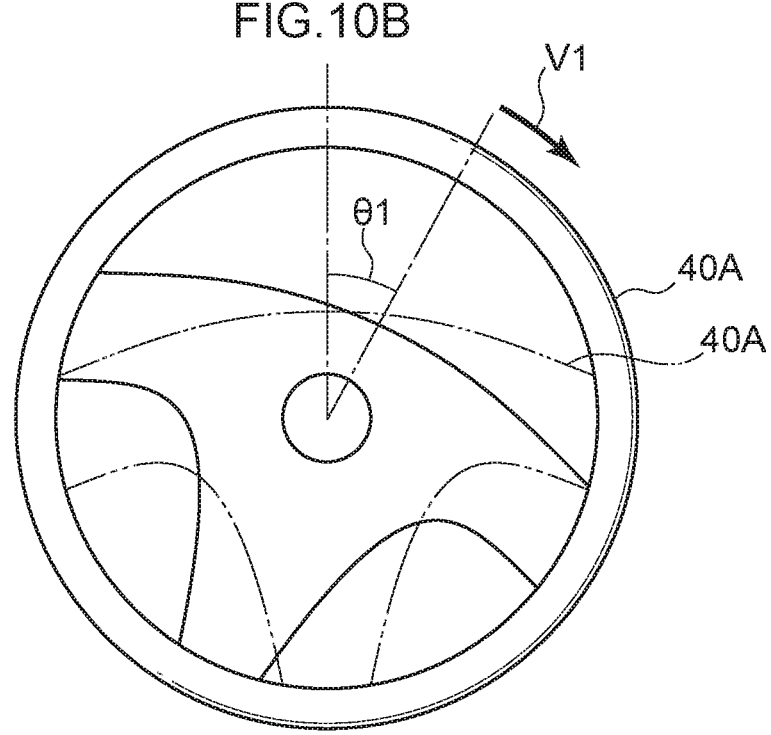
FIG. 10B is a schematic diagram showing movements of the steering wheels in the first training mode and the second training mode of the vehicle control system according to the present exemplary embodiment, illustrating movement of the steering wheel of the vehicle in the first training mode and of the steering wheel of the remote operation equipment in the second training mode.

Specifically, when the driver 22 at the remote operation equipment 14 turns the steering wheel 40A by a turning angle θ1 at an angular speed V1 as illustrated in FIG. 10A, the steering wheel 40A of the vehicle 12 is turned by the turning angle θ1 at the angular speed V1 as shown in FIG. 10B. In other words, operation amounts of the steering wheel 40A of the remote operation equipment 14 are reflected at the steering wheel 40A of the vehicle 12.

Figure 11A:
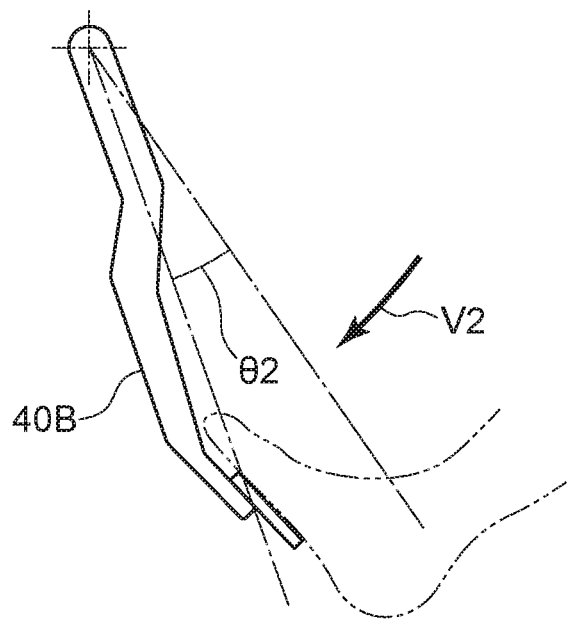
FIG. 11A is a schematic diagram showing movements of brake pedals in the first training mode and the second training mode of the vehicle control system according to the present exemplary embodiment, illustrating movement of a brake pedal of the remote operation equipment in the first training mode and of a brake pedal of the vehicle in the second training mode.
Figure 11B:
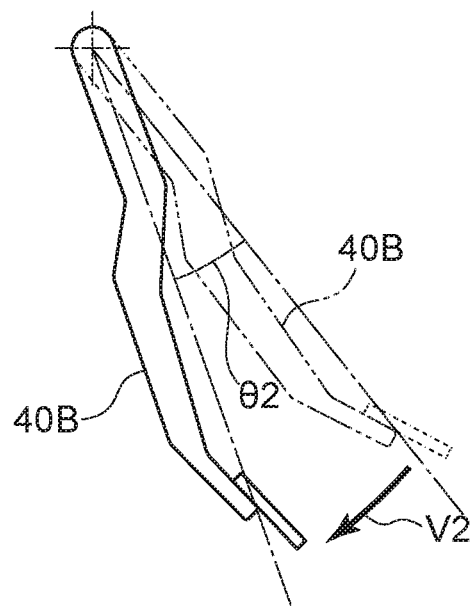
FIG. 11B is a schematic diagram showing movements of the brake pedals in the first training mode and the second training mode of the vehicle control system according to the present exemplary embodiment, illustrating movement of the brake pedal of the vehicle in the first training mode and of the brake pedal of the remote operation equipment in the second training mode.

Further, when the driver 22 at the remote operation equipment 14 presses the brake pedal 40B through a turning angle θ2 at an angular speed V2 as illustrated in FIG. 11A, the brake pedal 40B of the vehicle 12 is turned through the turning angle θ2 at the angular speed V2 as shown in FIG. 11B. In other words, operation amounts of the brake pedal 40B of the remote operation equipment 14 are reflected at the brake pedal 40B of the vehicle 12. The accelerator pedals 40C behave in a similar manner.

In step S205, on the basis of the status signals from the remote operation equipment 14, the CPU 18A detects the driving mode of the vehicle 12 and makes a determination as to whether the first training mode has ended. If the first training mode is continuing ("No" in step S205), the CPU 18A returns to step S202. If the first training mode is ending, ("Yes" in step S205), the CPU 18A ends this control flow.

Alternatively, when the CPU 18A has proceeded from step S201 to step S203, the CPU 18A makes a determination on the basis of the detection results from step S200 as to whether the driving mode of the vehicle 12 is the second training mode. If the driving mode of the vehicle 12 is the second training mode ("Yes" in step S203), the CPU 18A proceeds to step S206. If the driving mode of the vehicle 12 is not the second training mode ("No" in step S203), the CPU 18A ends this control flow.

In step S206, the CPU 18A functions as the operation information acquisition section 180 and acquires operation information, that is, operation amounts of the operating devices 40 at the operation section 34.

In step S207, the CPU 18A functions as the communications section 181 and sends this operation information to the remote operation equipment 14.

In step S208, on the basis of the status signals, the CPU 18A detects the driving mode of the vehicle 12 and makes a determination as to whether the second training mode has ended. If the second training mode is continuing ("No" in step S208), the CPU 18A returns to step S206. If the second training mode is ending ("Yes" in step S208), the CPU 18A ends this control flow.

Now, using FIG. 9 and FIG. 10A to FIG. 11B, a control flow of the operation section 50 of the remote operation equipment 14 is described. When this control flow is started, in step S300, the CPU 18A of the remote control device 20 detects the driving mode of the remote operation equipment 14 on the basis of the status signals.

In step S301, on the basis of detection results from step S300, the CPU 18A makes a determination as to whether the driving mode of the remote operation equipment 14 is the first training mode. If the driving mode of the remote operation equipment 14 is the first training mode ("Yes" in step S301), the CPU 18A proceeds to step S302. If the driving mode of the remote operation equipment 14 is not the first training mode ("No" in step S301), the CPU 18A proceeds to step S303.

In step S302, the CPU 18A functions as the operation information acquisition section 200 and acquires operation information, that is, operation amounts of the operating devices 40 at the operation section 50.

In step S304, the CPU 18A functions as the communications section 201 and sends this operation information to the vehicle 12.

In step S305, on the basis of the status signals, the CPU 18A detects the driving mode of the remote operation equipment 14 and makes a determination as to whether the first training mode has ended. If the first training mode is continuing ("No" in step S305), the CPU 18A returns to step S302. If the first training mode is ending ("Yes" in step S305), the CPU 18A ends this control flow.

Alternatively, when the CPU 18A has proceeded from step S301 to step S303, the CPU 18A makes a determination on the basis of the detection results from step S300 as to whether the driving mode of the remote operation equipment 14 is the second training mode. If the driving mode of the remote operation equipment 14 is the second training mode ("Yes" in step S303), the CPU 18A proceeds to step S305. If the driving mode of the remote operation equipment 14 is not the second training mode ("No" in step S303), the CPU 18A ends this control flow.

In step S306, the CPU 18A functions as the operation information acquisition section 200 and acquires operation information from the communications section 201, that is, operation amounts of the operating devices 40 at the operation section 34 of the vehicle 12.

In step S307, the CPU 18A functions as the control section 202 and drives the operation section 50 on the basis of this operation information.

Specifically, when the driver 24 at the vehicle 12 turns the steering wheel 40A by a turning angle θ1 at an angular speed V1 as illustrated in FIG. 10A, the steering wheel 40A of the remote operation equipment 14 is turned by the turning angle θ1 at the angular speed V1 as shown in FIG. 10B.

Further, when the driver 24 at the vehicle 12 presses the brake pedal 40B through a turning angle θ2 at an angular speed V2 as illustrated in FIG. 11A, the brake pedal 40B of the remote operation equipment 14 is turned through the turning angle η2 at the angular speed V2 as shown in FIG. 11B. The accelerator pedals 40C behave in a similar manner.

In step S308, on the basis of the status signals, the CPU 18A detects the driving mode of the remote operation equipment 14 and makes a determination as to whether the second training mode has ended. If the second training mode is continuing ("No" in step S308), the CPU 18A returns to step S306. If the second training mode is ending ("Yes" in step S308), the CPU 18A ends this control flow.

In the present exemplary embodiment as described above, operation amounts of the operation sections 34 and 50 may be transmitted between the driver 22 and the driver 24.

That is, when the vehicle 12 of the present exemplary embodiment is being used as a training vehicle, the driver 24 who is a training student may physically feel the technique of the driver 22 who is the trainer, which contributes to improving the technique of the driver 24. At other times, the driver 22 may verify movements of the steering wheel 40A, brake pedal 40B and accelerator pedal 40C being operated by the driver 24 and may check a proficiency level of the driving technique of the driver 24.

When the vehicle 12 is in any of a state of manual driving and a state of remote driving, operation amounts of the operation sections 34 and 50 may be transmitted between the driver 22 and the driver 24, and when this transmission of operation amounts is not required, the vehicle 12 may run by autonomous driving.

For example, when the vehicle 12 is to be used to conduct training on a road or the like, the autonomous driving mode may be selected and the vehicle 12 may be transferred to a predetermined location without being driven by the driver 24.

In the present exemplary embodiment, the signals S1 based on operations of the driver 22 operating the remote operation equipment 14 are sent from the communications section 201 and received at the server 16, and the signals S1 are sent from the server 16 to the communications section 181 of the vehicle 12. Meanwhile, the signals S2 based on operations of the driver 24 operating the vehicle 12 are sent from the communications section 181 and received at the server 16, and the signals S2 are sent from the server 16 to the communications section 201. Therefore, even when the vehicle 12 and the remote operation equipment 14 are far apart, operation amounts of the operation sections 34 and 50 may be transmitted between the driver 22 and the driver 24.

Supplementary Descriptions of the Above Exemplary Embodiment (1) In the exemplary embodiment described above, the touch panel 48 is disposed at the remote operation equipment 14 side and the remote control device 20 is equipped to function as the driving switching section 203, but this is not limiting. The touch panel 48 may be disposed at the vehicle 12 side and the vehicle control device 18 may be equipped to function as the driving switching section 203.

(2) In the exemplary embodiment described above, the vehicle control system 10 is provided with the vehicle 12, the server 16 and the remote operation equipment 14. However, if the objective is simulation for training, the vehicle control system 10 may be a system that does not include the vehicle 12 and the server 16. That is, the system may enable communications between two driving simulators without functions for remote control of the vehicle 12 from the remote operation equipment 14.

(3) The vehicle control system as described above may be structured by installing an operation terminal (an operating portion control device) including the functions of the operation information acquisition section, the communications section, the actuation control section and the driving switching section in each of an existing vehicle and a driving simulator.

(4) In the exemplary embodiment described above, operation amounts of a steering wheel, an accelerator pedal and a brake pedal are acquired. However, one or more of these operation amounts may be acquired, and operation amounts of alternative operated devices may be acquired.

An object of the present disclosure is to provide an operating portion control device and a vehicle control system that may transmit operation amounts of an operating portion between a first operator and a second operator.

A first aspect of the disclosure is an operating portion control device that includes: a memory and a processor connected to the memory. The processor is configured to: acquire operation amount information of a first operating portion that operates a vehicle; send first signals representing the operation amount information of the first operating portion, and receive second signals representing operation amount information of a second operating portion that operates the vehicle, the second operating portion being different from the first operating portion; switch between a state of sending the first signals and a state of receiving the second signals; and, on the basis of the second signals received in the state of receiving, actuate the first operating portion in accordance with an operation amount of the second operating portion.

According to the first aspect, the operation amount information of the first operating portion that operates the vehicle is acquired, and the first signals representing the operation amount information of the first operating portion are sent. The second signals representing the operation amount information of the second operating portion that operates the vehicle, which is different from the first operating portion, are received.

The operating portion control device can be switched between the state of sending the first signals and the state of receiving the second signals. In the state of receiving the second signals, the first operating portion is actuated in accordance with the operation amount information of the second operating portion.

Therefore, for example, if the operating portion control device of the present disclosure is installed in remote operation equipment that is provided with an operating portion that a first operator operates and in a vehicle that is provided with an operating portion that a second operator operates, operation amounts may be reflected between the operating portion of the remote operation equipment and the operating portion of the vehicle.

More specifically, when the operating portion control device at the remote operation equipment side is in the state of sending the first signals and the operating portion control device at the vehicle side is in the state of receiving the second signals, operation amounts of the operating portion of the remote operation equipment (the second operating portion) may be reflected at the operating portion of the vehicle (the first operating portion).

Conversely, when the operating portion control device at the vehicle side is in the state of sending the first signals and the operating portion control device at the remote operation equipment side is in the state of receiving the second signals, operation amounts of the operating portion of the vehicle (the second operating portion) may be reflected at the operating portion of the remote operation equipment (the first operating portion).

A second aspect of the disclosure is a vehicle control system that includes: a first processor installed at remote operation equipment that remotely operates a vehicle; and a second processor installed at the vehicle, wherein: the first processor is configured to acquire first operation amount information of a first operating portion installed at the remote operation equipment; the second processor is configured to acquire second operation amount information of a second operating portion installed at the vehicle; the first processor is configured to send first signals representing the first operation amount information and receive second signals representing the second operation amount information; the second processor is configured to send the second signals and receive the first signals; the first processor is configured to actuate the first operating portion on the basis of the received second signals; the second processor is configured to actuate the second operating portion on the basis of the received first signals; and one or both of the first processor and the second processor is configured to switch between a first mode, in which the second processor actuates the second operating portion on the basis of the first signals, and a second mode, in which the first processor actuates the first operating portion on the basis of the second signals.

According to the second aspect, the remote operation equipment that remotely operates the vehicle and the vehicle can be switched between the first mode and the second mode by one or both of the remote operation equipment and the vehicle.

In the state of the first mode, the first operation amount information of the first operating portion that is operated by a first operator at the remote operation equipment is acquired, and the first signals representing the first operation amount information are sent from the remote operation equipment. The first signals are received at the vehicle, and the vehicle actuates the second operating portion of the vehicle on the basis of the first signals. Therefore, the first operation amount information from the remote operation equipment can be reflected at the second operating portion of the vehicle.

Conversely, in the state of the second mode, the second operation amount information of the second operating portion that is operated by a second operator at the vehicle is acquired by the second operation information acquisition section, and the second signals representing the second operation amount information are sent. The second signals are received at the remote operation equipment, and the remote operation equipment actuates the first operating portion of the remote operation equipment on the basis of the second signals. Therefore, the second operation amount information from the vehicle can be reflected at the first operating portion of the remote operation equipment.

A third aspect of the disclosure is the vehicle control system of the second aspect, wherein the first operation amount information and the second operation amount information include operation amount information of one or more of a steering wheel, an accelerator pedal and a brake pedal.

According to the third aspect, operation amounts of at least one of the steering wheel, the accelerator pedal and the brake pedal may be transmitted between the first operator operating the remote operation equipment and the second operator operating the vehicle.

A fourth aspect of the disclosure is the vehicle control system of the second or the third aspect, further includes a server including a third processor that is configured to: receive the first signals from the first processor and send the first signals to the second processor, and receive the second signals from the second processor and send the second signals to the first processor.

According to the fourth aspect, the first signals representing the first operation amount information of the first operator operating the remote operation equipment are sent and are received at the server, and the first signals are sent from the server to the vehicle. Meanwhile, the second signals representing the second operation amount information of the second operator operating the vehicle are sent and are received at the server, and the second signals are sent from the server.

A fifth aspect of the disclosure is the vehicle control system any of the second to the fourth aspect, wherein the second processor is configured to autonomously drive the vehicle at a time when the second processor is not in the first mode or the second mode.

According to the fifth aspect, the vehicle may drive autonomously when not in the first mode or the second mode. The first to the fifth aspects can be realized in the form of methods.

The operating portion control device of the first aspect may transmit operation amounts of operating portions between a first operator and a second operator.

The vehicle control system of the second aspect may transmit operation amounts of operating portions between a first operator and a second operator.

The vehicle control system of the third aspect may contribute to the first operator understanding driving tech-nique of the second operator and to the second operator understanding driving technique of the first operator.

The vehicle control system of the fourth aspect may transmit operation amounts of the operating portions between the first operator and the second operator even when the vehicle and the remote operation equipment are far apart.

The vehicle control system of the fifth aspect may autonomously drive the vehicle when the transmission of operation amounts between the first operator and the second operator is not required.

What is claimed is:

1. An operating portion control device comprising
   a memory and
   a processor connected to the memory, the processor being configured to:
   acquire operation amount information of a first operating portion that operates a vehicle;
   send first signals representing the operation amount information of the first operating portion, and receive second signals representing operation amount information of a second operating portion that operates the vehicle, the second operating portion being different from the first operating portion;
   switch between a state of sending the first signals and a state of receiving the second signals; and,
   on the basis of the second signals received in the state of receiving, actuate the first operating portion in accordance with an operation amount of the second operating portion.

2. A vehicle control system comprising:
   a first processor installed at remote operation equipment that remotely operates a vehicle; and
   a second processor installed at the vehicle,
   wherein:
   the first processor is configured to acquire first operation amount information of a first operating portion installed at the remote operation equipment;
   the second processor is configured to acquire second operation amount information of a second operating portion installed at the vehicle;
   the first processor is configured to send first signals representing the first operation amount information and receive second signals representing the second operation amount information;
   the second processor is configured to send the second signals and receive the first signals;
   the first processor is configured to actuate the first operating portion on the basis of the received second signals;
   the second processor is configured to actuate the second operating portion on the basis of the received first signals; and
   one or both of the first processor and the second processor is configured to switch between a first mode, in which the second processor actuates the second operating portion on the basis of the first signals, and a second mode, in which the first processor actuates the first operating portion on the basis of the second signals.

3. The vehicle control system according to claim 2, wherein the first operation amount information and the second operation amount information include operation amount information of one or more of a steering wheel, an accelerator pedal and a brake pedal.

4. The vehicle control system according to claim 2, further comprising a server including a third processor that is configured to:

receive the first signals from the first processor and send the first signals to the second processor, and receive the second signals from the second processor and send the second signals to the first processor.

5. The vehicle control system according to claim 2, wherein the second processor is configured to autonomously drive the vehicle at a time when the second processor is not in the first mode or the second mode.

6. An operating portion control method comprising:

by a processer, acquiring operation amount information of a first operating portion that operates a vehicle;

sending first signals representing the operation amount information of the first operating portion, and receiving second signals representing operation amount information of a second operating portion that operates the vehicle, the second operating portion being different from the first operating portion;

switching between a state of sending the first signals and a state of receiving the second signals; and, on the basis of the second signals received in the state of receiving, actuating the first operating portion in accordance with an operation amount of the second operating portion.

* * * * *